(12) United States Patent
Talty et al.

(10) Patent No.: US 8,660,511 B2
(45) Date of Patent: Feb. 25, 2014

(54) ANTENNA DIVERSITY SCHEME EMPLOYING BAND PASS SAMPLING AND FAST SEMICONDUCTOR SWITCHING

(75) Inventors: Timothy J. Talty, Beverly Hills, MI (US); James H. Schaffner, Chatsworth, CA (US); Hyok Jae Song, Agoura Hills, CA (US); Joseph S. Colburn, Malibu, CA (US); Duane S. Carper, Davison, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 125 days.

(21) Appl. No.: 13/308,597

(22) Filed: Dec. 1, 2011

(65) Prior Publication Data

US 2012/0171977 A1    Jul. 5, 2012

Related U.S. Application Data

(60) Provisional application No. 61/429,793, filed on Jan. 5, 2011.

(51) Int. Cl.
*H04B 1/06* (2006.01)
*H04B 7/00* (2006.01)
*H05K 11/02* (2006.01)

(52) U.S. Cl.
USPC .......................................... 455/277.1; 455/345

(58) Field of Classification Search
USPC ................... 455/272, 277.1, 345; 375/347
See application file for complete search history.

(56) References Cited

U.S. PATENT DOCUMENTS

| | | |
|---|---|---|
| 6,115,370 A | 9/2000 | Struhsaker et al. |
| 6,131,012 A | 10/2000 | Struhsaker et al. |
| 6,144,645 A | 11/2000 | Struhsaker et al. |
| 6,351,456 B1 | 2/2002 | Struhsaker et al. |
| 6,434,129 B1 | 8/2002 | Struhsaker et al. |
| 6,512,751 B1 | 1/2003 | Struhsaker et al. |
| 6,668,174 B1 | 12/2003 | Struhsaker et al. |
| 7,564,910 B2 | 7/2009 | Kostic |
| 2010/0046588 A1* | 2/2010 | Rooyen .......................... 375/147 |
| 2011/0299630 A1* | 12/2011 | Petrovic ......................... 375/340 |

* cited by examiner

*Primary Examiner* — Nguyen Vo
(74) *Attorney, Agent, or Firm* — Quinn Law Group, PLLC

(57) ABSTRACT

A vehicle or other host station includes first and second antennas, a fast semiconductor switch, a switching controller, and an RF receiver. The controller toggles the switch at a calibrated switching rate to selectively and alternately connect the first antenna to one of the RF receiver and a load having a calibrated impedance value. The first antenna may be a parasitic element in any embodiment using the load. The semiconductor switch may be a CMOS device or a Gallium Arsenide semiconductor switch. A switching control method for use in a vehicle or other host station having the first antenna, the second antenna, and the RF receiver includes transmitting a switching signal from the controller to the switch, and toggling the switch at a calibrated switching rate in response to the switching signal to selectively and alternately connect the first antenna to one of the RF receiver and the load.

15 Claims, 2 Drawing Sheets

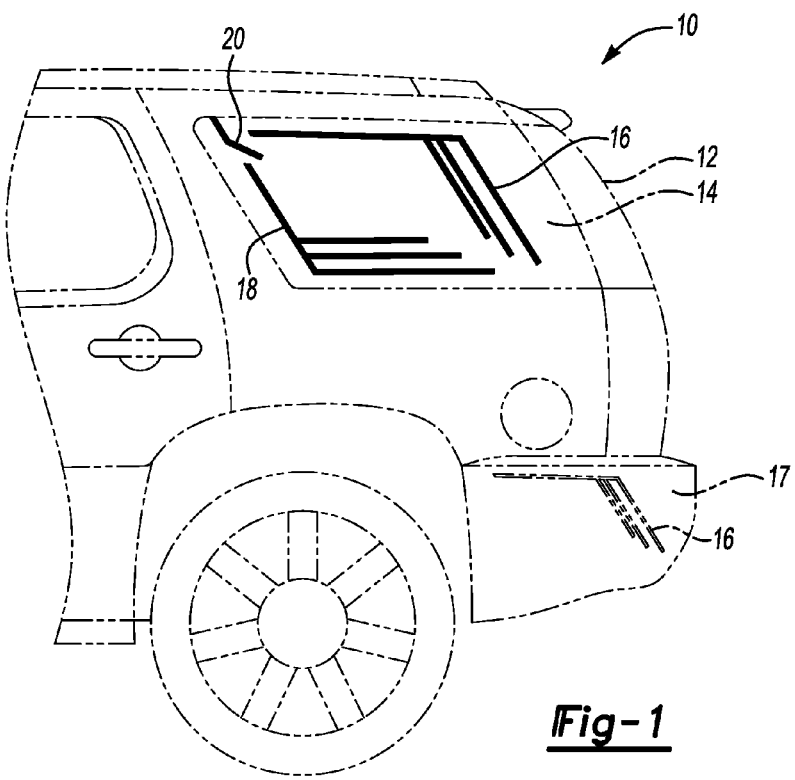
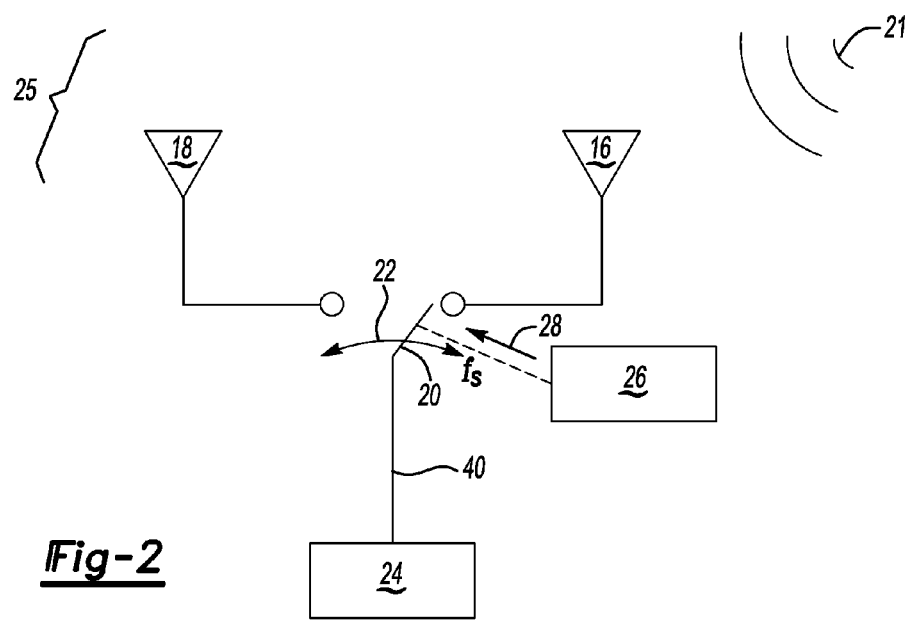

ANTENNA DIVERSITY SCHEME EMPLOYING BAND PASS SAMPLING AND FAST SEMICONDUCTOR SWITCHING

CROSS REFERENCE TO RELATED APPLICATIONS

This application claims the benefit of U.S. Provisional Patent Application No. 61/429,793 filed on Jan. 5, 2011, which is hereby incorporated by reference in its entirety.

TECHNICAL FIELD

The present disclosure relates to a system and method for improving radio frequency reception in a vehicle using multiple receiving antennas, i.e., antenna diversity, using band pass sampling and fast semiconductor switching.

BACKGROUND

Radio frequency (RF) communication involves the transmission of electrical energy through free space in the form of electromagnetic radio waves. Information carried by the radio waves may be controlled using various analog signal encoding techniques, the most common of which are amplitude modulation (AM) and frequency modulation (FM). Emerging satellite radio (XM) transmits radio waves at high frequencies via digital signal modulation.

Multiple receiving antennas may be used in what is referred to as an antenna diversity scheme. Antenna diversity may improve signal reception where multiple receiving paths exist, or in instances where reception by a single antenna is somehow obstructed. Conventional antenna diversity schemes require signal detection and/or demodulation, as well as complex decision algorithms to select between multiple antenna input signals. Since the decision algorithms and antenna control steps occur at a receiver, an RF cable is typically required between each diversity antenna and the receiver. The complexity of the diversity receiver and the required multiple RF cables often renders the use of a conventional antenna diversity scheme too costly for use in some systems, such as aboard a vehicle or in other multi-path RF applications.

SUMMARY

An antenna diversity system is disclosed herein that helps address some of the complexity and cost concerns noted above. The present system uses band pass sampling and high-speed semiconductor switching to execute the disclosed method independently of a radio receiver. The sampling and switching techniques are used together to combine multiple RF signals, i.e., to provide a particular antenna diversity scheme. The present approach may be beneficial, for instance, in a vehicle having multiple hidden antennas, or in any other system where a structural body obstructs a desired radiation pattern at one receiving antenna. As is well understood in the art and as used herein, the term "radiation pattern" refers to the particular geometric pattern presented by relative field strengths of an electromagnetic field.

For example, an antenna positioned on or within a front bumper of an example vehicle would have limited performance/radiation with respect to the rear of the vehicle, while an antenna positioned on or in the rear bumper would have limited performance/radiation with respect to the front of the vehicle. The present method used in conjunction with such a vehicle averages RF signals from the multiple antennas, and hence provides improved radio reception compared to using the front or the rear antennas alone.

Existing antenna diversity schemes generally employ relatively complex decision criteria to enable switching between the various antenna inputs. The decision criteria may be based on signal conditions that require signal detection and/or demodulation. A switching mechanism may reside in a module located near the antennas or within the radio receiver. The present method instead averages between the RF signals at a location that is external to the radio receiver using high-speed transistors or other semiconductor switching mechanisms, without the need for signal detection and/or demodulation, and without the decision criteria/algorithms noted above.

In particular, a system for use in a host station, e.g., an example vehicle as disclosed herein, includes a first antenna, a second antenna, a semiconductor switch, an RF receiver, and a switching controller. The switching controller continuously toggles the semiconductor switch at a calibrated switching rate. Toggling of the semiconductor switch rapidly connects and disconnects various antenna configurations with respect to the RF receiver. In another embodiment, the switch connects/disconnects the antennas to/from a load having a calibrated impedance value.

The second antenna is disconnected from the RF receiver when the first antenna is connected, and vice versa. When connecting/disconnecting with respect to the load, the second antenna is directly and continuously connected to the RF receiver, for instance via a coaxial cable. The first antenna is not physically connected to the RF receiver in this embodiment, and acts instead as a parasitic element. The parasitic element is used to alter the radiation characteristics of the second antenna such that nulls in any radiation patterns with respect to the parasitic element do not align with radiation pattern nulls occurring with the parasitic element disconnected from the second antenna. Thus, the average pattern between connecting/disconnecting the load has "filled-in" nulls, which in turn improves signal reception characteristics.

A switching method is also disclosed which may be executed aboard a host station having the above system, i.e., any host station having the first and second antennas, RF receiver, semiconductor switch, and switching controller noted above. The method includes transmitting a switching signal from the switching controller to the semiconductor switch. The method further includes continuously toggling the semiconductor switch at a calibrated switching rate in response to receipt of the switching signal by the switch. This selectively and alternately connects the first antenna to the RF receiver. In an alternative embodiment, the connection is made with respect to a load having a calibrated impedance value as noted above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a portion of a host station in the form of an example vehicle having multiple receiving antennae.

FIG. 2 is a schematic illustration of a system usable with a host station having the multiple receiving antennae of FIG. 1.

DETAILED DESCRIPTION

Figure 3:
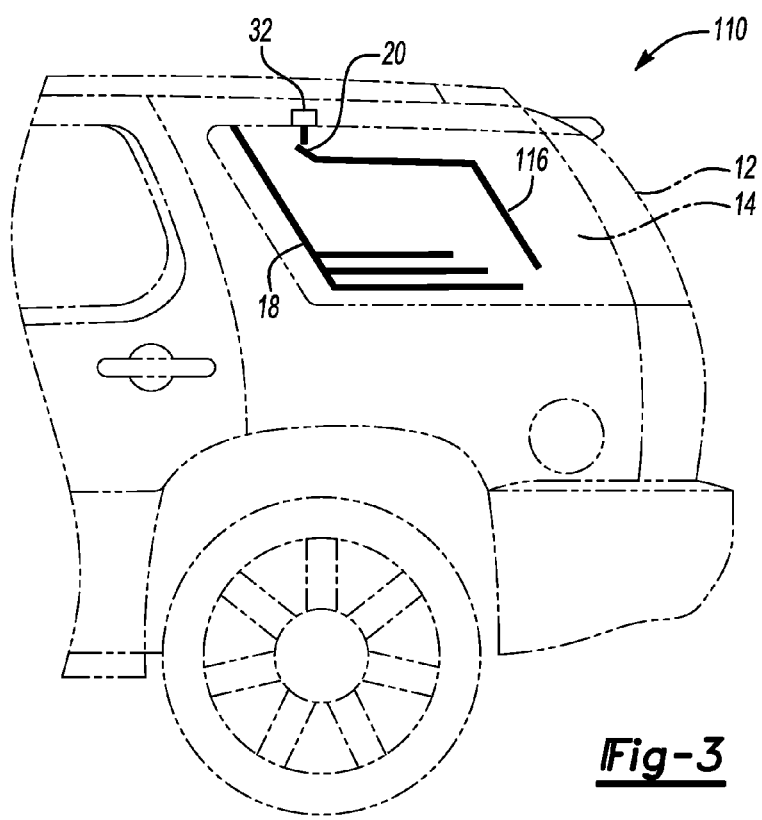
FIG. 3 is schematic illustration of a portion of a host station in the form of an example vehicle having an antenna which acts as a parasitic element.

Referring to the drawings, wherein like reference numbers refer to like components throughout the views, and beginning with FIG. 1, a schematic host station 10 is shown having a first antenna 16 and a second antenna 18. Either of the respective first or second antennas 16 or 18 may have limited radio reception relative to the other antenna depending on the positional relationship of antennas 16, 18 with respect to a transmitted or broadcasted radio signal, e.g., the RF signal 21 shown in FIG. 2. For example, of the antennas 16 or 18 may be obstructed at times, thus affecting reception at that particular antenna. Therefore, the antennas 16, 18 and other components of the host station 10 are controlled as set forth herein to optimize reception quality in the host station 10.

While two antennas are shown in FIG. 1, any plurality of antennas may be used with the host station 10. For simplicity, the plurality will be described hereinafter as two antennas 16 and 18. A semiconductor switch 20 is used aboard the host station 10 to alternatively connect the first antenna 16 and the second antenna 18 to a radio frequency (RF) receiver 24 (see FIGS. 2 and 4). That is, the semiconductor switch 20 is toggled at a calibrated switching frequency (arrow $f_S$) such that the first antenna 16 is connected to the RF receiver while the second antenna 18 is disconnected, and vice versa.

In the non-limiting example vehicle embodiment shown in FIG. 1, the antennas 16 and 18 are positioned on or embedded within a window glass 14, for instance a rear side window pane, and thus secured to a body component 12. Various body components 12 for positioning/connecting of the respective first and second antennas 16 and 18 are possible, including but not limited to within or concealed by a bumper 17, a pillar or other body panel, the window glass 14, etc. Such positioning may enable fully or partially concealed antennas 16, 18. Other possible embodiments for host station 10 include commercial or residential buildings, or any other suitable stationary or mobile structure.

Referring to FIG. 2, the host station 10 of FIG. 1 is therefore configured with an antenna diversity system 25 that enables use of multiple antennas, e.g., antennas 16 and 18. At least one of the antennas 16, 18 may be hidden in and/or concealed, for instance by the bumper 17 as shown in phantom, or contained within/positioned on the window glass 14, with the respective first and second antennas 16 and 18 having complementary radiation patterns. Use of the antenna diversity system 25 or the alternative embodiment shown in FIG. 4 may help to optimize the radio listening experience within the host station 10.

Referring to FIG. 2, the present antenna diversity system 25 includes the respective first and second antennas 16 and 18, the RF receiver 24, the semiconductor switch 20, and a switching controller 26. In some embodiments, the switching controller 26 draws power from a DC power supply (not shown), e.g., a 12-Volt auxiliary battery. For example, in an XM radio system, signal strength is weak relative to AM or FM radio broadcasts. A low-noise amplifier (not shown) is thus typically used to boost the XM signal before it is relayed via coaxial or other suitable cable 40 to the RF receiver 24. Some FM receivers also require a low-noise amplifier and DC power supply, and therefore powering via an auxiliary battery remains an option for all disclosed embodiments.

The respective first and second antennas 16 and 18 are positioned within the host station 10 to receive a transmitted RF signal 21. The RF signal 21 may be transmitted from any remote location, for instance an FM radio station tower or an XM satellite. The antenna diversity system 25 may also be used with AM radio. However, the size of the host station 10 and the respective first and second antennas 16, 18 would have to be scaled in this instance to accommodate the relatively large wavelengths and amplitudes of AM radio waves. Therefore, for most practical applications and uses, the RF signal 21 is expected to be at higher frequencies such as FM, XM, or television transmission frequencies.

The switching controller 26 of FIG. 2 may be configured in one embodiment as a switch control oscillator which automatically generates and transmits a switching signal (arrow 28) to the semiconductor switch 20. The switching signal (arrow 28) commands toggling of the semiconductor switch 20 at a calibrated switching frequency $f_S$). The switching action of the semiconductor switch 20 is represented in FIG. 2 by double-headed arrow 22, i.e., motion occurring back and forth between the antennas 16 and 18.

The switching controller 26 averages two or more antenna radiation patterns such that any narrow angular antenna pattern nulls are filled in. This pattern-averaging approach mitigates the effects of fast temporal signal fades due to multi-path interference, or pattern nulls due to the interposition of the body component(s) 12 of FIG. 1 or other structure which interferes with clear reception of the RF signal 21. The calibrated switching frequency ($f_S$) is faster than twice the modulated signal bandwidth, a term that is well known in the art of band pass sampling. Such a rapid switching rate is needed so that the RF receiver 24, e.g., an FM, XM, or other RF receiver, senses the average gain of the various antenna radiation patterns.

That is, to avoid aliasing and switching harmonics, the switching frequency ($f_S$) may be selected and recorded by the controller 26 as follows:

$$2f_H/n \leq f_S \leq 2f_L/(n-1)$$

$$2f_H/(n+1) \leq f_S \leq 2f_L/n$$

where n is an integer and $f_L$, $f_H$ are the respective calibrated low and high limits of a calibrated pass band. For example, for FM radio operating in the frequency band of about 88 MHz to about 108 MHz, and with an FM channel bandwidth of about 200 kHz, the switching rate ($f_S$) is a minimum of about 400 kHz. However, due to the densely populated nature of the FM radio band in the United States and in cities of most other industrialized countries, a low switching rate at the lowest theoretical limit is considered to be impractical. Various higher-frequency solutions exist for the above set of equations, with one possible example solution being a switching frequency of approximately 43 MHz for FM radio and approximately 100 MHz for XM radio.

The semiconductor switch 20 of FIG. 2 may be a Complementary Metal-Oxide-Semiconductor (CMOS) device in one possible embodiment, i.e., using complementary and symmetrical pairs of p-type and n-type metal oxide semiconductor transistors for its state or logic functions. Other rapidly actuating semiconductor switch designs such as Field Effect Transistors (FETs), insulated gate bipolar transistors (IGBTs), and/or other transistor switches may also be used to toggle at a high rate between the respective first and second antennas 16 and 18, provided that the selected transistor type is sufficiently durable and capable of maintaining the calibrated switching rate. In another embodiment, the semiconductor switch 20 may be configured as a Gallium Arsenide (GaAs) semiconductor switch. Such an embodiment may provide lower system losses, particularly when used with XM radio.

Referring to FIG. 3, an alternative host station 110 may be used in lieu of the host station 10 of FIG. 1. Host station 110 uses one or more parasitic elements 116 as one of the multiple antennas, in this instance replacing the first antenna 16 of FIG. 1. The semiconductor switch 20 selectively couples the parasitic element 116 to a load 32 having a calibrated impedance value. This results in a perturbation to the current distribution acting on the parasitic element 116, which in turn impacts the radiation patterns and the mutual coupling among the antennas, here element 116 and the second antenna 18.

Figure 4:
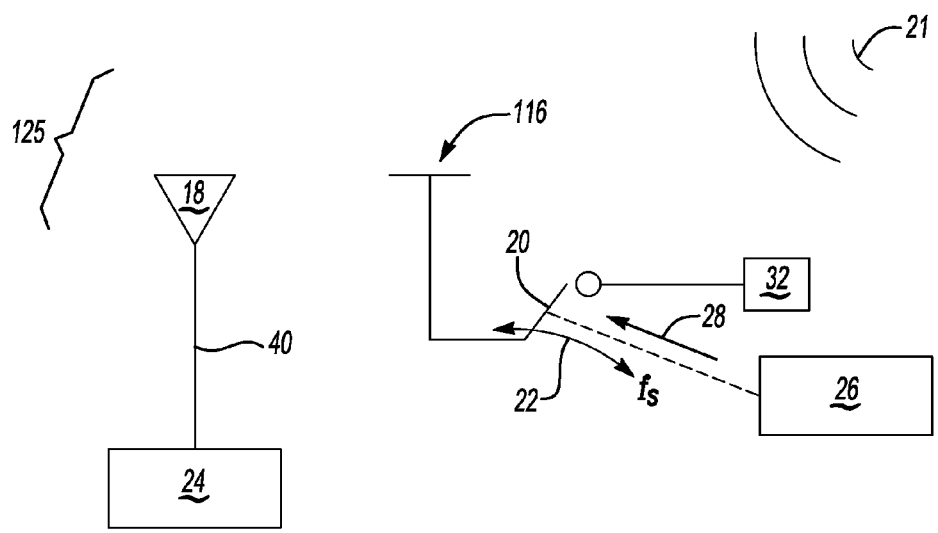
FIG. 4 is schematic illustration of a system usable with the host station shown in FIG. 3.

Referring to FIG. 4, the second antenna 18 is directly and continuously connected to the RF receiver 24 via the cable 40. The rapid switching of the semiconductor switch 20 perturbs the radiation pattern of the second antenna 18 due to the mutual coupling between the parasitic element/first antenna 116 and the second antenna 18. The RF receiver 24 senses the average gain of the antenna radiation patterns created by the various mutual coupling effects of the parasitic element 116.

As used herein, the term "gain" refers to the degree of directivity of a radiation pattern of a given antenna, for instance the second antenna 18. The term "parasitic element" refers to any electronic circuit element presenting a load, e.g., an inductor, a capacitor, or a resistor, having a quality that is not required for its intended purpose. All conductors possess resistance and inductance qualities, and where inductance is present there is also capacitance. A resistor thus possesses some amount of parasitic capacitance, and so forth. Therefore, the particular circuit element chosen as the load 32 and its calibrated impedance may be selected based on the size of the antennas 116, 18, and the nature of the received RF signal 21.

The antenna diversity system 25 or 125 set forth above may be used to improve RF signal reception under multi-path conditions, such as aboard the host station 10 or 110 (see FIGS. 1 and 3). A switching control method is therefore possible using the disclosed antenna diversity systems 25, 125. For example, such a method may include transmitting the switching signal (arrow 28 of FIGS. 2 and 4) from the switching controller 26 to the semiconductor switch 20, and then toggling the semiconductor switch 20 at the calibrated switching frequency ($f_S$) in response to the switching signal. In this manner, one may selectively and alternately connect the RF receiver 24 to the first antenna 16 and the second antenna 18, or the first antenna 16 to the load 32 when the first antenna is configured as the parasitic element 116. The above switching control method may be used in conjunction with additional post-switching noise filtering techniques to further optimize signal quality at the RF receiver 24 shown in FIGS. 2 and 4.

While the best modes for carrying out the invention have been described in detail, those familiar with the art to which this invention relates will recognize various alternative designs and embodiments for practicing the invention within the scope of the appended claims.

The invention claimed is:

1. A system comprising:
    a first antenna;
    a second antenna;
    a radio frequency (RF) receiver in communication with the first and second antennas;
    a semiconductor switch; and
    a switching controller which determines a calibrated switching frequency ($f_S$) using the equations $2f_H/n \le f_S \le f_L/(n-1) \le f_S \le 2f_L/n$, where n is an integer, $f_H$ is a calibrated high limit of a pass band, and $f_L$ is a calibrated low limit of the pass band, and then toggles the semiconductor switch at the calibrated switching frequency to thereby alternatively connect and disconnect the first antenna to at least one of the RF receiver and a load having a calibrated impedance value.

2. The system of claim 1, wherein toggling of the semiconductor switch alternatively:
    connects the first antenna to the RF receiver while disconnecting the second antenna from the RF receiver; and
    disconnects the first antenna from the RF receiver while connecting the second antenna to the RF receiver.

3. The system of claim 1, wherein the semiconductor switch is a complementary metal-oxide-semiconductor device.

4. The system of claim 1, wherein the semiconductor device is one of a field effect transistor device and an insulated gate bipolar transistor device.

5. The system of claim 1, wherein the semiconductor switch is a Gallium Arsenide semiconductor switch.

6. The system of claim 1, wherein the calibrated switching rate is about 43 KHz to about 100 MHz.

7. The system of claim 6, wherein the RF receiver is an FM receiver, and wherein the calibrated switching rate is greater than about 43 MHz.

8. The system of claim 6, wherein the RF receiver is an XM receiver, and wherein the calibrated switching rate is greater than about 100 MHz.

9. A host station comprising:
    a body component;
    a first antenna;
    a second antenna, wherein at least one of the first and second antennas is physically connected to the body component;
    a radio frequency (RF) receiver in communication with the first and second antennas;
    a semiconductor switch; and
    a switching controller which toggles the semiconductor switch at a calibrated switching frequency to thereby alternatively connect and disconnect the first antenna to at least one of the RF receiver and a load having a calibrated impedance value, wherein the switching controller is configured to:
        determine the calibrated switching frequency ($f_S$) using the equations $2f_H/n \le f_S \le 2f_L/(n-1)$ and $2f_H/(n+1) \le f_S \le 2f_L/n$, where n is an integer, $f_H$ is a calibrated high limit of a pass band, and $f_L$ is a calibrated low limit of the pass band; and
        record the calibrated switching rate.

10. The host station of claim 9, wherein toggling of the semiconductor switch alternatively:
    connects the first antenna to the RF receiver while disconnecting the second antenna from the RF receiver; and
    disconnects the first antenna from the RF receiver while connecting the second antenna to the RF receiver.

11. The host station of claim 9, wherein the body component is a window glass.

12. The host station of claim 11, wherein the host station is a vehicle.

13. The host station of claim 9, wherein the host station is a vehicle and the body component is a bumper.

14. A switching method for use in a host station having a body component, a first antenna, a second antenna, a radio frequency (RF) receiver, and a switching controller, wherein at least one of the first and second antennas are connected to the body component, the method comprising:
    transmitting a switching signal from the switching controller to a semiconductor switch;
    determining a calibrated switching frequency ($f_S$) using the equations $2f_H/n \le f_S \le 2f_L/(n-1)$ and $2f_H/(n+1) \le f_S \le 2f_L/n$, where n is an integer, $f_H$ is a calibrated high limit of a pass band, and $f_L$ is a calibrated low limit of the pass band;

toggling the semiconductor switch at the calibrated switching frequency in response to the switching signal to thereby selectively and alternately connect the first antenna to one of the RF receiver and a load having a calibrated impedance; and recording the calibrated switching rate via the controller.

15. The method of claim 14, wherein toggling of the semiconductor switch includes alternatively:

connecting the first antenna to the RF receiver while disconnecting the second antenna from the RF receiver; and disconnecting the first antenna from the RF receiver while connecting the second antenna to the RF receiver.

* * * * *